(12) United States Patent
Wolf et al.

(10) Patent No.: US 9,440,663 B2
(45) Date of Patent: Sep. 13, 2016

(54) SPRING DEVICE FOR A RAIL VEHICLE

(71) Applicant: Bombardier Transportation GmbH, Berlin (DE)

(72) Inventors: Andreas Wolf, Winterthur (CH); Michael Wusching, Wilthen (DE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 14/402,851

(22) PCT Filed: May 29, 2013

(86) PCT No.: PCT/EP2013/061135
§ 371 (c)(1),
(2) Date: Nov. 21, 2014

(87) PCT Pub. No.: WO2013/178719
PCT Pub. Date: Dec. 5, 2013

(65) Prior Publication Data
US 2015/0108701 A1    Apr. 23, 2015

(30) Foreign Application Priority Data

May 30, 2012    (EP) ..................................... 12170115

(51) Int. Cl.
| | |
|---|---|
| *B61F 5/08* | (2006.01) |
| *F16F 1/373* | (2006.01) |
| *F16F 1/387* | (2006.01) |
| *F16F 1/371* | (2006.01) |

(52) U.S. Cl.
CPC ............... *B61F 5/08* (2013.01); *F16F 1/3713* (2013.01); *F16F 1/3732* (2013.01); *F16F 1/3876* (2013.01)

(58) Field of Classification Search
CPC ............ B61F 5/08; B61F 5/305; F16F 1/36; F16F 1/371; F16F 1/3713; F16F 1/3716; F16F 1/373; F16F 1/3732; F16F 1/3876
See application file for complete search history.

(56) References Cited

U.S. PATENT DOCUMENTS

| | | | | |
|---|---|---|---|---|
| 3,134,585 | A | | 5/1964 | Trask |
| 3,575,403 | A | * | 4/1971 | Hamel .................... B61F 5/305 105/198.7 |
| 3,584,858 | A | * | 6/1971 | Beck ..................... F16F 1/3713 267/153 |
| 4,522,378 | A | * | 6/1985 | Nelson .................. F16B 5/0258 16/2.1 |

(Continued)

FOREIGN PATENT DOCUMENTS

| | | |
|---|---|---|
| CA | 2784534 A1 | 2/2013 |
| CN | 203257956 U | 10/2013 |
| DE | 8535955 U1 | 2/1986 |
| DE | 4136926 A | 5/1993 |

(Continued)

*Primary Examiner* — Anna Momper
(74) *Attorney, Agent, or Firm* — The Webb Law Firm

(57) ABSTRACT

The present invention relates to a spring device including a spring body substantially made of a polymeric material and defining an axial direction and a radial direction. The spring body, in the axial direction, has a central section located between a first end section terminating in a first outer end surface and a second end section terminating in a second outer end surface, the central section having at least one radially waisted section. The first end section has a recess extending, in the axial direction, from the first outer end surface towards the central section such that an axial spring body cavity is formed, the axial spring body cavity being confined by a compliant inner surface. An insert is inserted into the axial spring body cavity, the insert contacting the inner surface of the spring body to modify a rigidity of the spring device.

20 Claims, 4 Drawing Sheets

(56) References Cited

U.S. PATENT DOCUMENTS

| | | |
|---|---|---|
| 4,690,388 A | 9/1987 | Harrison |
| 4,723,491 A | 2/1988 | von Madeyski et al. |
| 4,941,409 A | 7/1990 | Richter et al. |
| 5,415,107 A | 5/1995 | Tutzauer |
| 2009/0116772 A1* | 5/2009 | Herman ............... B60G 13/003 384/224 |
| 2015/0108701 A1 | 4/2015 | Wolf et al. |

FOREIGN PATENT DOCUMENTS

| | | | | |
|---|---|---|---|---|
| DE | 102005004203 | * | 7/2006 | ........... B60K 5/1208 |
| DE | 102011110090 A1 | | 2/2013 | |
| EP | 0337135 A2 | | 10/1989 | |
| EP | 2031270 A1 | | 3/2009 | |
| GB | 775248 A | * | 5/1957 | .............. F16F 1/373 |
| GB | 2156946 A | | 3/1985 | |
| GB | 2342974 A | | 4/2000 | |

\* cited by examiner

SPRING DEVICE FOR A RAIL VEHICLE

CROSS-REFERENCE TO RELATED APPLICATIONS

This application is the United States national phase of International Application No. PCT/EP2013/061135 filed May 29, 2013, and claims priority to European Patent Application No. 12170115.5 filed May 30, 2012, the disclosures of which are hereby incorporated in their entirety by reference.

BACKGROUND OF THE INVENTION

1. Field of the Invention

The present invention relates to a spring device, in particular for a secondary suspension device of a rail vehicle, comprising a spring body substantially made of a polymeric material and defining an axial direction and a radial direction. The spring body, in the axial direction, has a central section located between a first and section terminating in a first outer end surface and a second end section terminating in a second outer end surface. The central section has at least one radially waisted section, while the first end section has a recess extending, in the axial direction, from the first outer end surface towards the central section such that an axial spring body cavity is formed, the axial spring body cavity being confined by a compliant inner surface. The invention further relates to a running gear comprising such a spring device.

2. Description of Related Art

Such spring devices well known in the art and used, for example, as a part of a secondary suspension device as shown in EP 0 337 135 B1 (the entire disclosure of which is incorporated herein by reference). Typically, the axial spring body cavity is used to mount and center the spring body to the running gear and the wagon body unit (e.g. the wagon body itself or a bolster connected to the wagon body). Obviously, the generally hourglass shaped design of the spring body as shown in EP 0 337 135 B1 has to be adapted to the specific rail vehicle. In particular, its axial rigidity (i.e. the rigidity along the central spring body axis) as well as its transverse rigidity (i.e. the rigidity transverse to the central spring body axis) has to be tuned to the specific vehicle is used in.

This has the disadvantage that, typically, for every single vehicle type a separate spring design has to be developed and tested, which renders the design of the secondary suspension comparatively time-consuming and expensive.

SUMMARY OF THE INVENTION

Thus, it is the object of the present invention to provide a spring device as described above, which does not show the disadvantages described above, or at least shows them to a lesser extent, and which, in particular, has a design that is simpler and more easily adaptable to varying requirements for different vehicle types.

The present invention is based on the technical teaching that a design that is simpler and more easily adaptable to varying requirements for different vehicle types can be accomplished, if the axial spring body cavity is configured to receive an insert which is configured to modify, by its mere presence and contact with the compliant inner surface of the spring body confining the actual cavity, the axial rigidity and/or the transverse rigidity of the spring device.

More precisely, the insert, in the respective direction, simply exerts an additional resistance against the deformation of the mating compliant wall of the spring body. This additional resistance simply depends on the size, geometry and mechanical properties of the insert. Hence, the use of different inserts, in a very simple way, allows modification of the spring properties, in particular, the axial and/or transverse rigidity, of the spring device.

A further advantage of the present invention lies within the fact that a different material may on be used for the spring body and the insert. This additional degree of design freedom, compared to known designs bound to the material of the spring body, provides further flexibility in adapting the spring properties. Hence, a wider variety of spring characteristics may be achieved using very simple, easy to manufacture inserts.

Hence, according to one aspect, the present invention relates to a spring device, in particular for a secondary suspension device of a rail vehicle, comprising a spring body substantially made of a polymeric material and defining an axial direction and a radial direction. The spring body, in the axial direction, has a central section located between a first end section terminating in a first outer end surface and a second end section terminating in a second outer end surface. The central section has at least one radially waisted section, while the first end section has a recess extending, in the axial direction, from the first outer end surface towards the central section such that an axial spring body cavity is formed, the axial spring body cavity being confined by a compliant inner surface. An insert is inserted into the axial spring body cavity, the insert contacting the inner surface of the spring body to modify a rigidity of the spring device compared to a reference state, where the insert is not inserted into the axial spring body cavity.

It should be noted that the insert does not necessarily have to be a monolithic component. Rather the insert may be formed by two or more insert elements stacked or otherwise combined to form the insert for the spring body cavity.

Any mechanical property of the spring device which is responsive to the presence of the insert within the spring body may be tuned to the specific application using such inserts. Preferably, the insert is configured to modify at least one of an axial rigidity and a transverse rigidity of the spring device, the axial rigidity being a rigidity of the spring device in the axial direction, the transverse rigidity being a rigidity of the spring device in a transverse direction running transverse to the axial direction.

It should be noted that the insert may not only be used to statically modify the respective mechanical property, e.g. by simply adding a constant offset to the respective characteristic of the spring body. Rather, the insert may also be used to variably modify the characteristic of the respective mechanical property. Hence, for example, depending on the design of the insert, the insert may be used to provide not only an at least section wise constant offset in the characteristic of the respective mechanical property (e.g. the respective rigidity) with increasing deflection. It may also be used to provide an at least section wise progressive and/or and at least section wise degressive characteristic of the respective mechanical property (e.g. a section wise progressive rigidity and/or a section wise degressive rigidity).

Generally, any shape providing a desired influence on the mechanical property of the spring device may be used. With particularly simple and efficient embodiments of the invention, the insert is at least one of a substantially dome shaped component and a toroid component. It should be noted that, in the sense of the present invention, a toroid component is a component having a geometry that is generated by rotating a planar closed contour (of arbitrary shape) about a central axis of rotation (a full toroid being generated when rotating about 360°). The central axis of rotation may intersect the contour. If this is not the case, a so-called ring toroid is generated. With a certain preferred embodiments of very simple design, the insert at least section-wise is of a substantially conical outer shape or substantially spherical outer shape.

The outer wall of the insert may have any desired shape appropriately mating with the spring body cavity wall. Preferably, the insert is confined by an insert outer wall surface, the insert outer wall surface, in a sectional plane comprising a central axis of the insert, having a section-wise curved sectional contour and/or a section-wise straight sectional contour and/or a section-wise polygonal sectional contour. In this way, the respective mechanical characteristic of the insert may be adapted to the desired mechanical characteristic of the spring device to be achieved.

The mechanical characteristic of the insert (required to achieve the desired modification of the corresponding mechanical characteristic of the spring device) may be achieved by any desired and suitable means. For example, the insert may have sections of different rigidity in order to achieve a specific characteristic.

With preferred embodiments of the invention, appropriate tuning of the mechanical properties of the insert, in particular, its resistance to deflection, may be achieved by providing an insert cavity located at an end side of the insert facing away from the central section of the spring body. Such an insert cavity provides an additional degree of design freedom which allows a very simple adaptation of the resistance to deflection by simply modifying the shape of the cavity.

Depending on the mechanical properties of the insert to be achieved, any desired and suitable shape may be used for the insert cavity. Preferably, the insert cavity at least section-wise is of a substantially toroid outer shape, in particular, of substantially conical outer shape or substantially spherical outer shape. Such a design allows a very simple and easy to manufacture adaptation of the mechanical properties.

As the axial spring body cavity, the insert cavity may have any desired shape. Preferably, the insert cavity is confined by an insert cavity wall surface, the insert cavity wall surface, in a sectional plane comprising a central axis of the insert cavity, having a section-wise curved sectional contour and/or a section-wise straight sectional contour and/or a section-wise polygonal sectional contour.

The dimensions of the insert and the insert cavity generally may be adapted to the specific modification of the mechanical property or properties of the spring device to be achieved. Particularly suitable configurations are achieved with the following dimensions realized alone or in arbitrary combinations.

Generally, the insert defines, in the radial direction, a maximum outer insert diameter and a minimum outer insert diameter, and, in the axial direction, a maximum axial insert dimension. Preferably, the minimum outer insert diameter is 40% to 90%, preferably 50% to 80%, more preferably 60% to 70%, of the maximum outer insert diameter. Furthermore, preferably, the maximum axial insert dimension being 40% to 80%, preferably 45% to 75%, more preferably 55% to 65%, of a maximum axial spring body cavity dimension in the axial direction.

Furthermore, generally, the insert cavity defines, in the radial direction, a maximum insert cavity diameter and a minimum insert cavity diameter, and, in the axial direction, a maximum axial insert cavity dimension. Here, preferably, the maximum insert cavity diameter is 50% to 90%, preferably 55% to 85%, more preferably 65% to 75%, of the maximum outer insert diameter. In addition or as alternative, the minimum insert cavity diameter is 20% to 60%, preferably 25% to 55%, more preferably 35% to 45%, of the maximum insert cavity diameter. Furthermore, preferably, the maximum axial insert cavity dimension is 50% to 90%, preferably 55% to 85%, more preferably 65% to 75%, of a maximum axial insert dimension in the axial direction.

The spring body and the insert may be made from any desired and suitable material. In some cases, they may be made from the same material. Preferably, however, the spring body is made from a first material and the insert is made from a second material different from the first material, the first material, in some cases, being less rigid than the second material. Preferably, the insert is made from a polymeric material, in particular, from a polyamide (PA) material. In addition or as an alternative, the spring body is made from a polymeric material, in particular, from a rubber material. Both variants provide easy to manufacture and robust solutions.

The insert and/or the spring body may be made from a plurality of different components. Preferably, however, very simple and robust configurations are achieved if at least one of the insert and the spring body is a monolithic component.

The mechanical properties of the insert and/or the spring body may be directional, i.e. dependent on the direction of action. To achieve this and asymmetric design may be selected for the respective component. Preferably, in particular, in the radial direction, a nondirectional behavior is provided, e.g. by a rotationally symmetric design. Hence, preferably, at least one of the insert and the spring body is a substantially rotationally symmetric component.

The spring body may have any desired shape adapted to fulfill the requirements of the respective application. With very simple and easy to manufacture embodiments, the spring body is of a substantially toroid outer shape, in particular, it is substantially hour-glass shaped.

Here as well, any desired shape of the other contour of the spring body may be chosen, which is adapted to the specific application. Preferably, the spring body is confined by a spring body outer wall surface, the spring body outer wall surface, in a sectional plane comprising a central axis of the spring body, having a section-wise curved sectional contour and/or a section-wise straight sectional contour and/or a section-wise polygonal sectional contour.

Similar applies to the spring body cavity. Hence, preferably, the spring body cavity at least section-wise is of a substantially toroid outer shape, in particular, of substantially conical outer shape or substantially spherical outer shape. Furthermore, preferably, the spring body cavity is confined by an spring body cavity wall surface forming the inner surface, the spring body cavity wall surface, in a sectional plane comprising a central axis of the spring body cavity, having a section-wise curved sectional contour and/or a section-wise straight sectional contour and/or a section-wise polygonal sectional contour.

The dimensions of the spring body and the spring body cavity generally may be adapted to the specific application of the spring device, in particular to the mechanical property or properties of the spring device to be achieved. Particularly suitable configurations are achieved with the following dimensions realized alone or in arbitrary combinations.

Generally, the spring body defines, in the first and section and in the radial direction, a maximum outer spring body diameter, while the at least one waisted section, in the radial direction, defines a minimum waist diameter of the spring body located, in the axial direction, at a maximum axial waist distance from the first outer end surface. Preferably, the minimum waist diameter is 50% to 90%, preferably 60% to 85%, more preferably 70% to 80%, of the maximum outer spring body diameter. In addition or as an alternative, the spring body, in the axial direction, extends over a maximum axial spring dimension, the maximum axial waist distance, in particular, being 30% to 50%, preferably 35% to 47%, more preferably 40% to 44%, of the maximum axial spring dimension.

Furthermore, generally, the spring body cavity defines, in the radial direction, a maximum spring body cavity diameter and a minimum spring body cavity diameter, and, in the axial direction, a maximum axial spring body cavity dimension. Preferably, the maximum spring body cavity diameter is 50% to 90%, preferably 55% to 85%, more preferably 65% to 75%, of the maximum outer spring body diameter. In addition or as alternative, the minimum spring body cavity diameter is 30% to 70%, preferably 35% to 65%, more preferably 45% to 55%, of the maximum spring body cavity diameter. Furthermore, preferably, the maximum axial spring body cavity dimension is 40% to 90%, preferably 50% to 80%, more preferably 60% to 70%, of the maximum axial waist distance.

With certain preferred embodiments of the invention having a robust design showing advantageous long-term stable spring properties, the central section comprises an inner reinforcement unit. The inner reinforcement unit preferably comprises a hollow, in particular cylindrical, reinforcement bush, the bush, in the radial direction, defining a maximum outer bush diameter and, in the axial direction, a maximum axial bush dimension.

Preferably, the bush, in particular, in the axial direction, reaches up to the spring body cavity, such that proper reinforcement of the sensitive central section is achieved. Furthermore, preferably, the bush, in the axial direction, forms an axial passage through the central section which, in particular, is radially and/or axially substantially centrally located. By this means, the comparatively lightweight configuration may be achieved. The bush may be mounted by any suitable means. Preferably, the bush, at its outer circumference, is firmly connected to the spring body.

The dimensions of the bush generally may be adapted to the specific mechanical property or properties of the spring device to be achieved. Particularly suitable configurations are achieved with the following dimensions realized alone or in arbitrary combinations.

Preferably, the maximum outer bush diameter is 85% to 115%, preferably 90% to 110%, more preferably 95% to 105%, of a maximum spring body cavity diameter in the radial direction. In addition or as alternative, the maximum axial bush dimension is 35% to 65%, preferably 40% to 60%, more preferably 45% to 55%, of a maximum axial spring body dimension in the axial direction.

With further preferred embodiments of the invention, the inner reinforcement unit of the central section comprises a reinforcement plate element, the reinforcement plate element mainly extending in the radial direction and defining, in the radial direction, a maximum outer reinforcement plate diameter. The reinforcement plate element may be a single reinforcement element. Preferably, however, the reinforcement plate element is combined with the reinforcement bush. In this case, preferably, the reinforcement plate element, in the radial direction, is connected to the bush.

The reinforcement plate element may be located at any desired location in the axial direction. Preferably, the reinforcement plate element is located in an area of a local radial protrusion of the spring body, which preferably is located radially and/or axially substantially centrally within the spring body. The reinforcement plate element may protrude from the spring body. Preferably, however, the reinforcement plate element is substantially fully embedded in the spring body, thereby achieving corrosion protection on the reinforcement plate element.

Any desired and suitable dimensions may be selected for the reinforcement plate element. Preferably, the maximum outer reinforcement plate diameter is 75% to 105%, preferably 80% to 100%, more preferably 85% to 95%, of a maximum spring body diameter in the radial direction.

It will be appreciated that arbitrary materials suitable for providing the reinforcement function may be used for the reinforcement unit. Preferably, the reinforcement unit is made from a third material different from the first and second material outlined above. Typically, the third material is a metal, thereby achieving simple and inexpensive reinforcement. With particularly lightweight designs, an aluminum (Al) material is used for the reinforcement unit.

The spring body may be directly connected to the adjacent vehicle components such as the running gear and/or a wagon body unit. Preferably, however, at least one of the end sections is covered by a support plate element providing an interface that is easily handled during manufacture of the vehicle. The support plate element preferably comprises a centering section axially protruding into a cavity of the spring body, thereby achieving a proper interface to the adjacent vehicle component.

Furthermore, with preferred embodiments of the invention, at least one of the end sections has an embedded reinforcement component. The embedded reinforcement component may be located at any suitable location. Preferably, the embedded reinforcement component is embedded in the spring body close to the outer end surface.

Any desired and suitable material may be chosen for either one of the support plate element and the embedded reinforcement component. Preferably, at least one of the support plate element and the embedded reinforcement component are made from a metal, in particular, an aluminum (Al) material.

It should be noted that it may be sufficient to provide the possibility to adapt the spring characteristics via the insert (as it has been outlined above) only in the first end section of the spring body. Preferably, however, a similar approach is taken for the second and section, thereby beneficially widening the scope and extent, respectively, of possible modifications to the spring characteristics.

Hence, with advantageous embodiments of the invention, the second end section has a recess extending, in the axial direction, from the second outer end surface towards the central section such that a further axial spring body cavity is formed, the further axial spring body cavity being confined by a compliant inner surface. A further insert is inserted into the further axial spring body cavity, the further insert contacting the inner surface of the spring body to modify a rigidity of the spring device compared to a reference state, where the further insert is not inserted into the axial spring body cavity.

It will be appreciated that the second end section and/or the further insert may have an identical design, in particular identical dimensions, as the first and section and/or the insert as outlined above. With certain embodiments, however, deviating design and/or dimensions may also be chosen.

The present invention furthermore relates to a running gear for a rail vehicle, comprising a spring device according to the invention. Preferably, the spring device forms part of a secondary spring device adapted to support a wagon body unit on the running gear. Obviously, the present invention also relates to a rail vehicle comprising a wagon body unit supported on such a running gear.

Further embodiments of the present invention will become apparent from the dependent claims and the following description of preferred embodiments which refers to the appended figures.

DETAILED DESCRIPTION OF THE INVENTION

Figure 1:
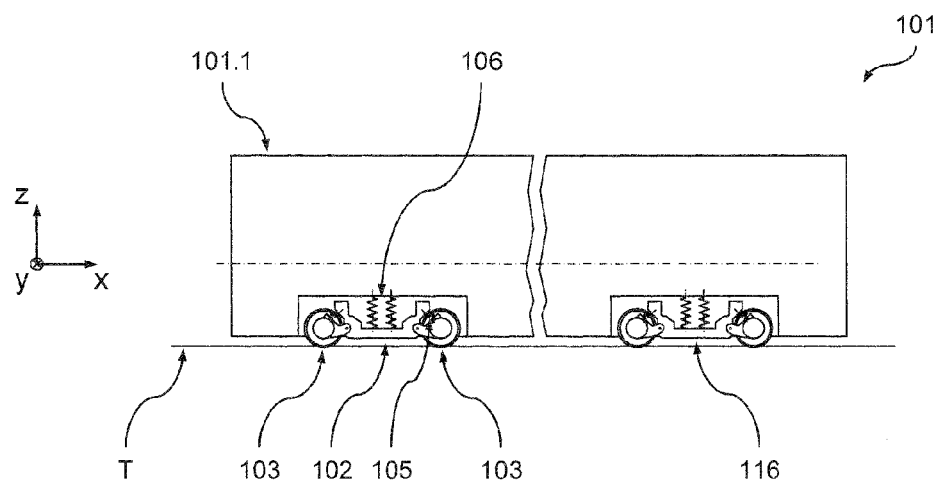
FIG. 1 is a schematic side view of a part of a preferred embodiment of a rail vehicle according to the present invention with a preferred embodiment of a running gear unit according to the present invention.

With reference to FIGS. 1 to 8 a preferred embodiment of a rail vehicle unit 101 according to the present invention comprising a preferred embodiment of a running gear 102 according to the invention will now be described in greater detail. In order to simplify the explanations given below, an xyz-coordinate system has been introduced into the Figures, wherein (on a straight, level track T) the x-axis designates the longitudinal direction of the rail vehicle 101, the y-axis designates the transverse direction of the rail vehicle 101 and the z-axis designates the height direction of the rail vehicle 101 (the same, of course, applies for the running gear 102). It will be appreciated that all statements made in the following with respect to the position and orientation of components of the rail vehicle, unless otherwise stated, refer to a static situation with the rail vehicle 101 standing on a straight level track under nominal loading.

The vehicle 101 is a low floor rail vehicle such as a tramway or the like. The vehicle 101 comprises a wagon body 101.1 supported by a suspension system on the running gear 102. The running gear 102 comprises two wheel units in the form of wheel sets 103 supporting a running gear frame 104 via a primary spring unit 105. The running gear frame 104 supports the wagon body via a secondary spring unit 106.

The running gear frame 104 has a frame body 107 comprising two longitudinal beams 108 and a transverse beam unit 109 providing a structural connection between the longitudinal beams 108 in the transverse direction, such that a substantially H-shaped configuration is formed. Each longitudinal beam 108 has two free end sections 108.1 and a central section 108.2. The central section 108.2 is connected to the transverse beam unit 109 while the free end sections 108.1 form a primary suspension interface 110 for a primary suspension device 105.1 of the primary suspension unit 105 connected to the associated wheel unit 103. In the present example, a compact and robust rubber-metal-spring is used for the primary spring device 105.1.

Each longitudinal beam 108 has an angled section 108.3 associated to one of the free end sections 108.1. Each angled section 108.3 is arranged such that the free end section 108.1 forms a pillar section mainly extending in the height direction. Hence, basically, the frame body 107 has a comparatively complex, generally three-dimensional geometry.

Each longitudinal beam 108 has a pivot interface section 111 associated to the free end section 108.1. The pivot interface section 111 forms a pivot interface for a pivot arm 112 rigidly connected to a wheel set bearing unit 103.1 of the associated wheel unit 103. The pivot arm 112 is pivotably connected to the frame body 107 via a pivot bolt connection 113. The pivot bolt connection 113 comprises a pivot bolt 113.1 defining a pivot axis 113.2. The bolt 113.1 is inserted into matching recesses in a forked end of the pivot arm 112 and a pivot interface recess 111.1 in a lug 111.2 of the pivot interface section 111 (the lug 111.2 being received between the end parts of the pivot arm 112).

To reduce the complexity of the frame body 107, the respective pivot interface section 111 is integrated into to the angled section 108.3 of the longitudinal beams 108, such that, nevertheless, a very compact arrangement is achieved. More precisely, integration of the pivot interface section 111 into the angled section 108.3 leads to a comparatively smooth, unbranched geometry of the frame body.

This compact, smooth and unbranched arrangement, among others, makes it possible to form the frame body 107 as a monolithically cast component. More precisely, the frame body 107 is formed as a single piece cast in an automated casting process from a grey cast iron material. The grey cast iron material has the advantage that it comprises a particularly good flow capability during casting due to its high carbon content and thus leads to a very high level of process reliability.

Casting is done in conventional molding boxes of an automated casting production line. Consequently, production of the frame body 107 is significantly simplified and rendered more cost effective than in conventional solutions with welded frame bodies. In fact, it has turned out that (compared to a conventional welded frame body) a cost reduction by more than 50% may be achieved with such an automated casting process.

The grey cast iron material used in the present example is a so called nodular graphite iron cast material or spheroidal graphite iron (SGI) cast material as currently specified in European Norm EN 1563. More precisely, a material such as EN-GJS-400-18U LT is used, which provides a good compromise between strength, elongation at fracture and toughness, in particular at low temperatures. Obviously, depending on the mechanic requirements on the frame body, any other suitable cast material as outlined above may be used.

To achieve proper integration of the pivot interface section 111 into the angled section 108.3, the respective pivot interface section 111, in the longitudinal direction (x-axis), is arranged to be retracted behind the associated free end section 108.1.

Furthermore (as can be seen, in particular, from FIG. 5), a considerable reduction in the building space (required for frame body 107 within the running gear 102) is accomplished in that the primary suspension interface 110 is configured such that the total resultant support force $F_{TRS}$ acting in the area of the respective free end 108.1 (i.e. the total force resulting from all the support forces acting via the primary suspension 105 in the region the free end 108.1, when the running gear frame 104 is supported on the wheel unit 103) is substantially parallel with respect to the xz-plane, while being inclined with respect to the longitudinal direction (x-axis) by a primary suspension angle $\alpha_{PSF,x}$ and inclined with respect to the height direction (z-axis) by a complementary primary suspension angle $$\alpha_{PSF,z} = 90° - \alpha_{PSF,x}. \quad (1)$$

Such an inclination of the total resultant support force $F_{TRS}$, compared to a configuration as known from DE 41 36 926 A1, allows the primary suspension device 105.1 to move closer to the wheel set 103, more precisely closer to the axis of rotation 103.2 of the wheel set 103. This has not only the advantage that the primary suspension interface 110 also can be arranged more closely to the wheel unit, which clearly saves space in the central part of the running gear 102. Furthermore, the pivot arm 112 connected to the wheel set bearing unit 103.1 can be of smaller, more lightweight and less complex design.

Furthermore, such an inclined total resultant support force $F_{TRS}$ yields the possibility to realize a connection between the pivot arm 112 and the frame body 107 at the pivot interface 111 which is both self adjusting under load (due to the components of the total resultant force $F_{TRS}$ acting in the longitudinal direction and the height direction) while being easily dismounted in absence of the support load $F_{TRS}$ as it is described in greater detail in pending German patent application No. 10 2011 110 090.7 (the entire disclosure of which is incorporated herein by reference).

Finally, such a design has the advantage that, not least due to the fact that the primary suspension interface section 110 moves closer to the wheel set 103, it further facilitates automated production of the frame body 107 using an automated casting process.

Although, basically, the total resultant support force $F_{TRS}$ may have any desired and suitable inclination with respect to the longitudinal direction and the height direction, in the present example, the total resultant support force $F_{TRS}$ is inclined with respect to the longitudinal direction by a primary suspension angle $\alpha_{PSF,x}=45°$. Consequently, the total resultant support force is inclined with respect to the height direction by a complementary primary suspension angle $\alpha_{PSF,z}=90°-\alpha_{PSF,x}=45°$. Such an inclination provides a particularly compact and, hence, favorable design. Furthermore, it also provides an advantageous introduction of the support loads $F_{TRS}$ from the wheel set 103 into the frame body 107. Finally, as a consequence, the pillar section or end section 108.1 may be formed in a slightly forward leaning configuration which is favorable in terms of facilitating cast material flow and, hence, use of an automated casting process.

Figure 5:
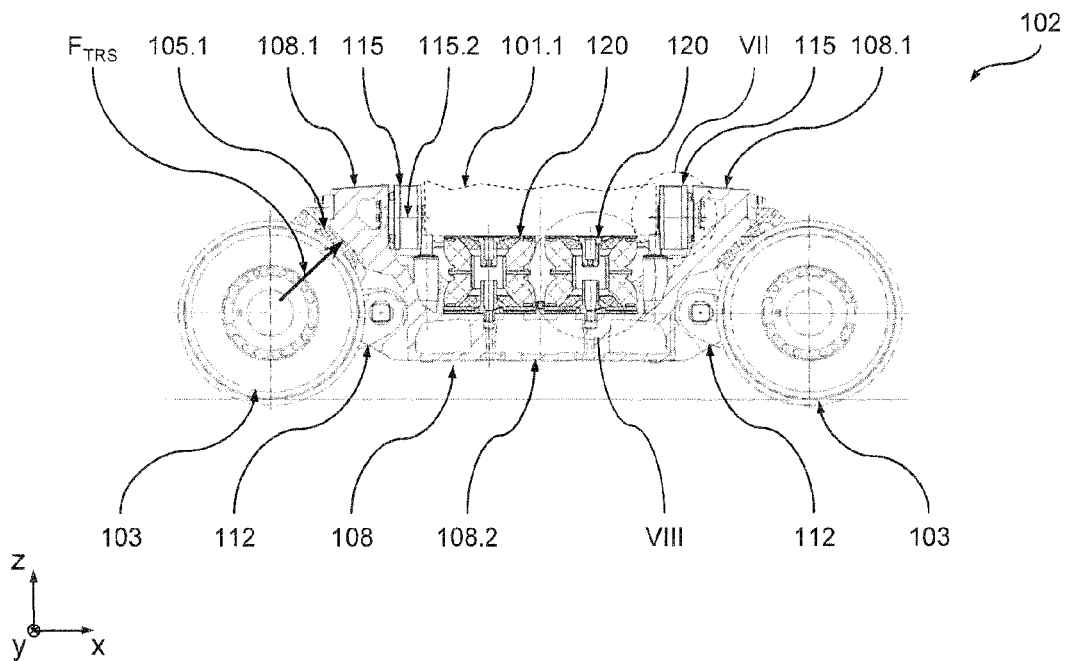
FIG. 5 is a schematic sectional view of a part of the running gear unit along line V-V of FIG. 1.

As may be further seen from FIG. 5, the primary suspension interface 110 and the primary suspension device 105.1 are arranged such that the total resultant support force $F_{TRS}$ intersects a wheel set shaft 103.3 of the wheel set 103, leading to a favorable introduction of the support loads from the wheel set 103 into the primary suspension device 105.1 and onwards into the frame body 107. More precisely, the total resultant support force $F_{TRS}$ intersects the axis of wheel rotation 103.2 of the wheel shaft 103.3.

Such a configuration, among others, leads to a comparatively short lever arm of the total resultant support force $F_{TRS}$ (for example, a lever arm $A_{TRS}$ at the location of the pivot bolt 113.1) and, hence, comparatively low bending moments acting in the longitudinal beam 108, which, in turn, allows a more lightweight design of the frame body 107.

A further advantage of the configuration as outlined above is the fact that the pivot arm 112 may have a very simple and compact design. More precisely, in the present example, the pivot arm 112 integrating the wheel set bearing unit 103.1, apart from the forked end section (receiving the pivot bolt 113.1) simply has to provide a corresponding support surface for the primary spring device 105.1 located close to the outer circumference of the wheel set bearing unit 103.1. Hence, compared to known configurations, no complex arms or the like are necessary for introducing the support forces into the primary spring device 105.1.

The transverse beam unit 109 comprises two transverse beams 109.1, which are arranged to be substantially symmetric to each other with respect to a plane of symmetry parallel to the yz-plane and arranged centrally within the frame body 107. The transverse beams 109.1 (in the longitudinal direction) are separated by a gap 109.5.

Figure 3:
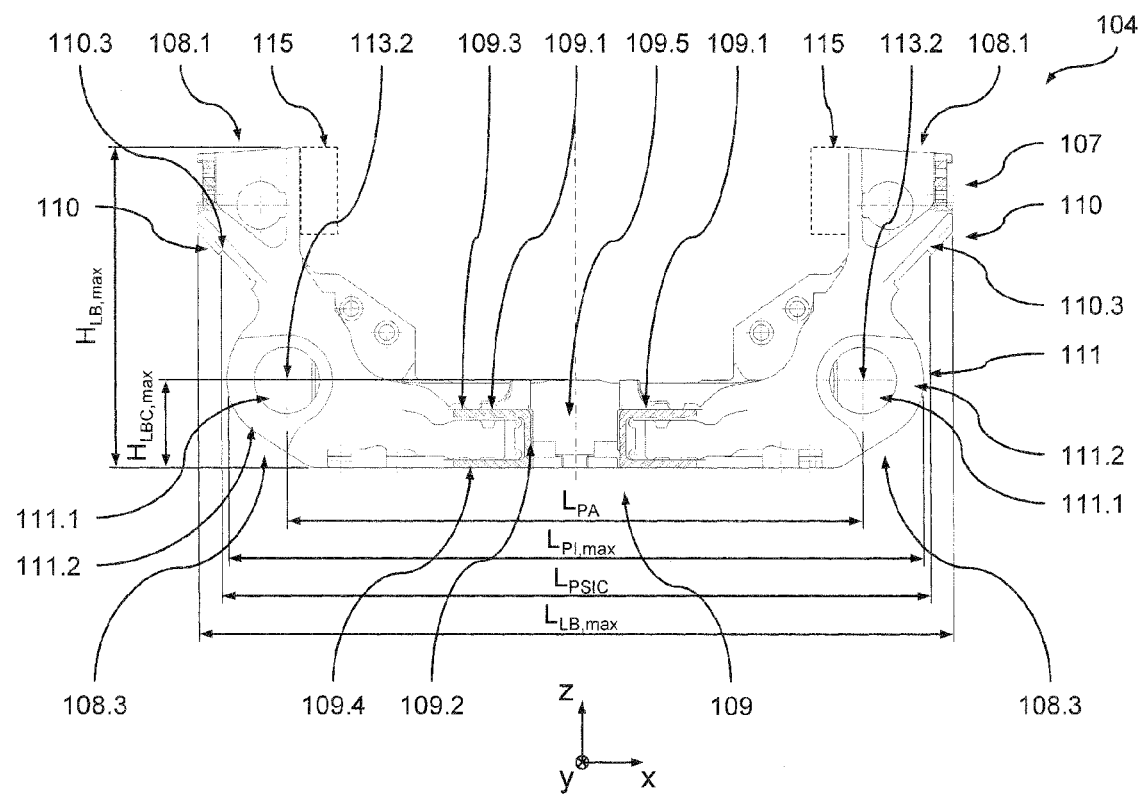
FIG. 3 is a schematic sectional view of the frame body of FIG. 2 along line of FIG. 1.
Figure 4:
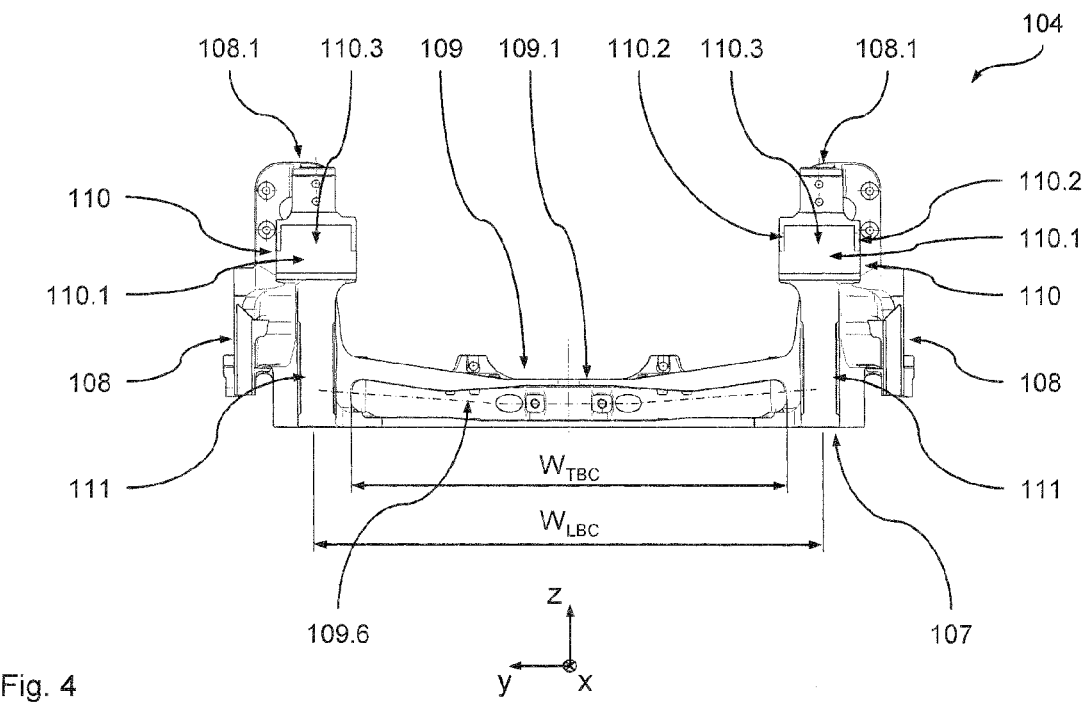
FIG. 4 is a schematic frontal view of the frame body of FIG. 2.

As can be seen from FIG. 3, each transverse beam 109.1, in a sectional plane parallel to the xz-plane, has a substantially C-shaped cross section with an inner wall 109.2, an upper wall 109.3, and a lower wall 109.4. The C-shaped cross section is arranged such that, in the longitudinal direction, it is open towards the (more closely located) free end of the frame body 107, while it is substantially closed by the inner wall 109.2 located adjacent to the center of the frame body 107. In other words, the open sides of the transverse beams 109.1 are facing away from each other.

Such an open design of the transverse beam 109.1 has the advantage that (despite the general rigidity of the materials used) not only the individual transverse beam 109.1 is comparatively torsionally soft, i.e. shows a comparatively low resistance against torsional moments about the transverse y-axis (compared to a closed, generally box shaped design of the transverse beam). The same applies to the transverse beam unit 109 as a whole, since the inner walls 109.2 (in the longitudinal direction) are located comparatively centrally within the transverse beam unit 109, such that their contribution to the torsional resistance moment about the transverse y-axis is comparatively low.

Furthermore, the gap 109.5, in a central area of the frame body 107, has a maximum longitudinal gap dimension $L_{G,max}$, which is about 100% of a minimum longitudinal dimension $L_{TB,min}$ of one of the transverse beams 109.1 in the longitudinal direction (in the central area of the frame body 107). The gap 109.5 has the advantage that the bending resistance in the plane of main extension of the two transverse beams 109.1 (parallel to the xy-plane) is increased without adding to the mass of the frame body 107, such that a comparatively lightweight configuration is achieved.

Figure 6:
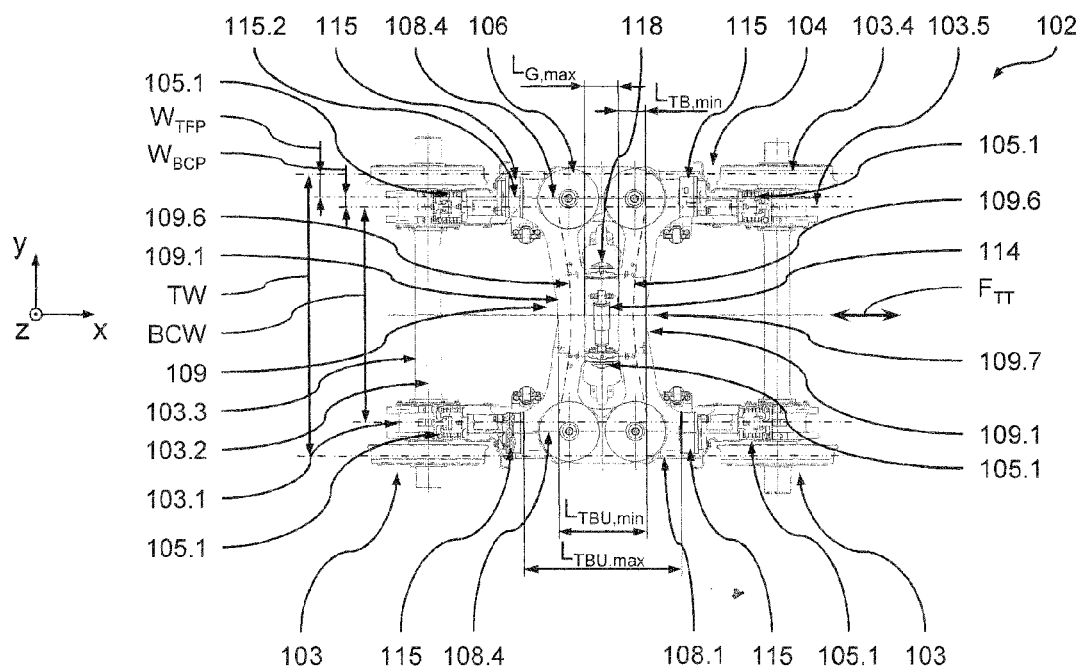
FIG. 6 is a schematic top view of the running gear unit of FIG. 1.

Furthermore, the gap 109.5 is readily available for receiving other components of the running gear 102 (such as a transverse damper 114 as shown in FIG. 6), which is particularly beneficial in modern rail vehicles with their severe constraints regarding the building space available.

The C-shaped cross section extends over a transversally central section of the transverse beam unit 109, since, at this location, a particularly beneficial influence on the torsional in rigidity of the transverse beam unit is achieved. In the present embodiment, the substantially C-shaped cross section extends over the entire extension of the transverse beam unit in the transverse direction (i.e. from one longitudinal beam 108 to the other longitudinal beam 108). Hence, in the present example, the C-shaped cross section extends over a transverse dimension $W_{TBC}$, which is 85% of a transverse distance $W_{LBC}$ between longitudinal center lines 108.4 of the longitudinal beams 108 in the area of the transverse beam unit 109. By this means a particularly advantageous torsional rigidity may be achieved even with such a grey cast iron frame body 107.

As for as the extension in the transverse direction is concerned, the same (as for the C-shaped cross-section) also applies to the extension of the gap 109.5. Furthermore, it should be noted that the longitudinal gap dimension doesn't necessarily have to be the same along the transverse direction. Any desired gap width may be chosen as needed.

In the present example, each transverse beam 109.1 defines a transverse beam center line 109.6, which has a generally curved or polygonal shape in a first plane parallel to the xy-plane and in a second plane parallel to the yz-plane. Such generally curved or polygonal shapes of the transverse beam center lines 109.6 have the advantage that the shape of the respective transverse beam 109.1 is adapted to the distribution of the loads acting on the respective transverse beam 109.1 resulting in a comparatively smooth distribution of the stresses within the respective transverse beam 109.1 and, ultimately, in a comparatively lightweight and stress optimized frame body 107.

Figure 2:
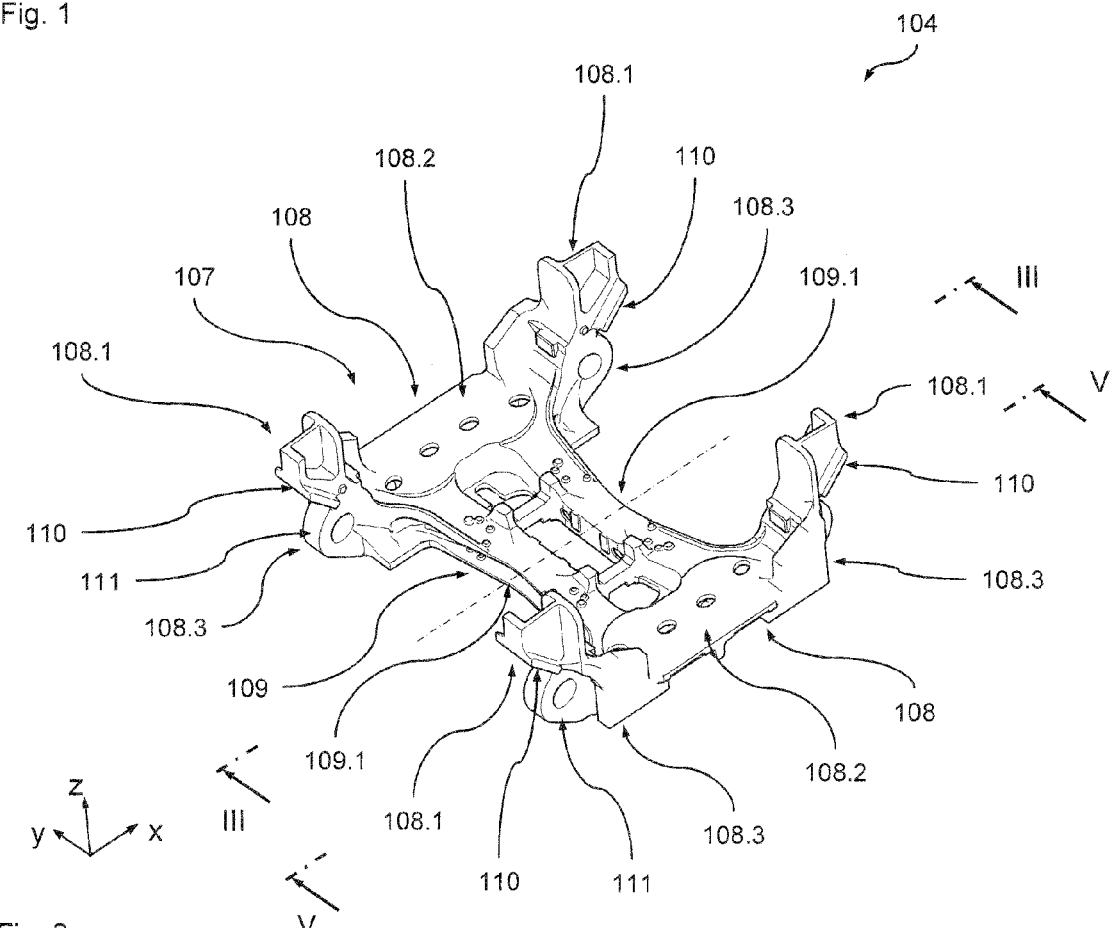
FIG. 2 is a schematic perspective view of a frame body of the running gear unit of FIG. 1.

As a consequence, as can be seen from FIGS. 2 and 6, the transverse beam unit 109 is a centrally waisted unit with a waisted central section 109.7 defining a minimum longitudinal dimension of the transverse beam unit $L_{TBU,min}$ (in the longitudinal direction) which, in the present example, is 65% of a maximum longitudinal dimension of the transverse beam unit $L_{TBU,max}$ (in the longitudinal direction). This maximum longitudinal dimension, in the present example, is defined at the junction of the transverse beam unit 109 and the longitudinal beams 108.

Generally, the extent of the waist of the transverse beam unit 109 may be chosen as a function of the mechanical properties of the frame body 107 (in particular, the torsional rigidity of the frame body 107) to be achieved. In any case, with the transverse beam unit design as outlined herein, a well-balanced configuration is achieved showing both, comparatively low torsional rigidity (about the transverse direction) and comparatively high bending rigidity (about the height direction). This configuration is particularly advantageous with respect to the derailment safety of the running gear 102 since the running gear frame 104 is able to provide some torsional deformation tending to equalize the wheel to rail contact forces on all four wheels of the wheel sets 103.

As can be further seen from FIGS. 3 and 6, in the present example, each free end section 108.1, in a section facing away from the primary spring interface 110 (hence, facing towards the longitudinal center of the running gear 102), forms a buffer interface for a rotational buffer device 115. The four rotational buffer devices 115 integrate the functionality of a rotational buffer device and a longitudinal buffer device for the wagon body 101.1. Furthermore, according to the present invention, the four rotational buffer devices 115 also are adapted to pairwise form a traction link between the frame body 107 and the wagon body 101.1 supported on the frame body 107 via the secondary suspension device 106. It will be appreciated that such a configuration is particularly beneficial since it provides a high degree of functional integration leading to a comparatively lightweight overall design as will be explained in more detail in the following.

The rotational buffer devices 115 integrate the ability to form a traction link between the running gear 102 and the wagon body 101.1 without having any noticeable loss in riding comfort due to a late onset of the traction force transmission. More precisely, the two rotational buffer devices 115 located, in the longitudinal direction, on the same side of the running gear center (but on different lateral sides of the running gear 102) form a first rotational buffer device 115 and a second rotational buffer device 115 which are not only adapted to damp a rotational motion between the running gear 102 and the wagon body 101.1 about a rotational axis parallel to the height direction. The first rotational buffer device 115 and the second rotational buffer device 115 are configured to form a traction link between the running gear 102 and the wagon body 101.1 configured to transmit at least a major fraction of a total traction force $F_{TT}$ to be transmitted along the longitudinal direction between the running gear 102 and the wagon body 101.1.

In the present example, apart from the traction links formed by the rotational buffer devices 115, no further traction link element is provided between the running gear 102 and the wagon body 101.1. Consequently, the traction link formed by the first and second rotational buffer devices 115 (mounted to the frame body 107 and the first contact partner in the sense of the present invention) transmits, in a first direction (e.g. a direction of forward travel), the remaining fraction of the total traction force $F_{TT}$ to be transmitted to the wagon body 101.1 (at the second contact partner in the sense of the present invention), which is not already taken or transmitted, respectively, by the secondary suspension device 106.

Figure 7:
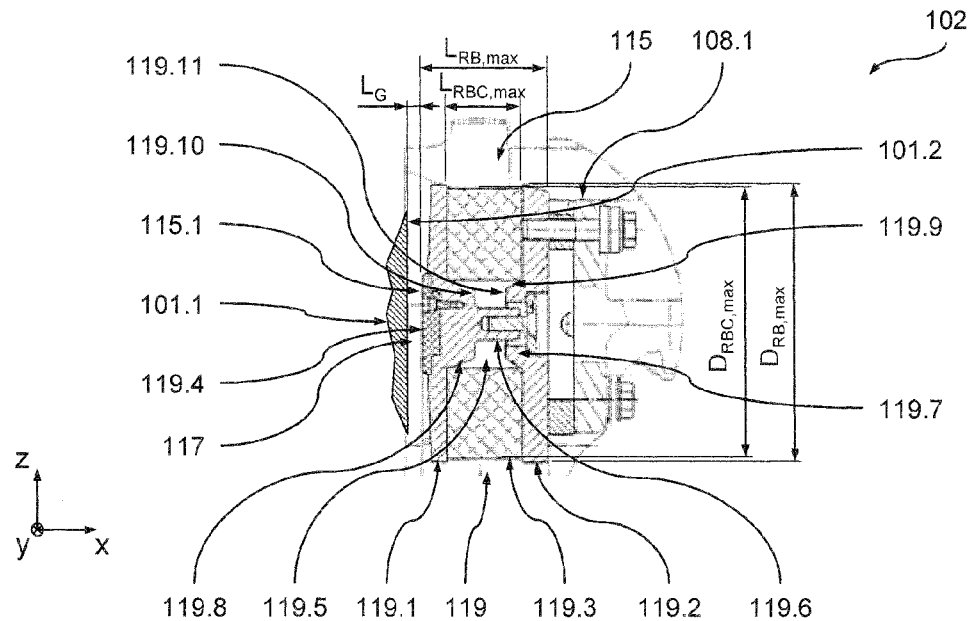
FIG. 7 is a schematic sectional view of detail VII of FIG. 5.

As can be seen best from FIG. 7, traction force transmission between the running gear 102 and the wagon body 101 is provided via a first contact surface 115.1 of the rotational buffer device 115 contacting a second contact surface 101.2 formed at the wagon body 101.1. All four rotational buffer devices 115 are arranged such that the first contact surface 115.1 and the second contact surface 101.2, in a neutral state of the rail vehicle unit 101 (i.e. with the rail vehicle standing on a straight, level track), are separated by a longitudinal gap 117 having a comparatively small longitudinal gap dimension $L_G$=1 mm in the longitudinal direction.

In this neutral state, the two contact surfaces 115.1 and 101.2 are in very close proximity (in the longitudinal direction) but do not contact each other. Moreover, the two contact surfaces 115.1 and 101.2 are arranged such that the width of the gap 117 remains unchanged if there is relative motion between the running gear 102 and the wagon body 101.1 exclusively in the height direction and/or exclusively in the transverse direction. Hence, wear of the contact surfaces is considerably reduced, since no friction loaded motion occurs if there is such relative exclusively in the height direction and/or exclusively in the transverse direction.

Furthermore, the rotational buffer devices 115 initially do not counteract angular deflection of the wagon body 101.1 with respect to the running gear (about a rotational axis parallel to the height direction). At a certain deflection between the running gear 102 and the wagon body 101.1 in the longitudinal direction, however, the two contact surfaces 115.1 and 101.2 contact each other, thereby starting traction force transmission in the longitudinal direction via the contact surfaces 115.1 and 101.2 (i.e. via the respective rotational buffer device 115).

The small width of gap 117 in the neutral position has the advantage that a delay of the onset of traction force transmission which would be noticeable and felt to be annoying by the passengers of the vehicle 101 (e.g. as a noticeably abrupt longitudinal acceleration) is avoided. Still, with the present example, the width of gap 117 is sufficiently large to provide acceptable angular deflection between the running gear 102 and the wagon body 101.1.

Arrangement of the rotational buffer devices 115 at the free end sections 108.1 has the inventors that traction force transmission through the rotational buffer devices 115 occurs in spatially close arrangement to the traction force introduction areas where the traction forces are introduced into the running gear 102 and into the frame body 107.

More precisely, the wheel sets 103 define a track width TW in the transverse direction and a traction force plane 103.4. The traction force plane 103.4, in the neutral state of the rail vehicle unit, extends through the respective wheel to rail contact point of one of the wheels of the wheel sets 103 and is perpendicular to the transverse direction. The wheel sets 103 further define a bearing center width BCW between centers of the wheel bearings 103.1 in the transverse direction and a bearing center plane 103.5. The bearing center plane 103.5, in the neutral state of the rail vehicle 101, extends through the center of the wheel bearings 103.1 and is perpendicular to the transverse direction. Furthermore, each rotational buffer device 115 has a volumetric center 115.2 (which may also be referred to as the centroid of volume or volumetric centroid).

The volumetric center 115.2 of each of the rotational buffer devices 115, in the transverse direction, has a transverse traction force plane distance $W_{TFP}$ with respect to the associated traction force plane 103.4 which is about 8% of the track width TW. In addition, the volumetric center 115.2 of each of the rotational buffer devices 115, in the transverse direction, has a transverse bearing center plane distance $W_{BCP}$ with respect to the bearing center plane 103.5 which is 6% of the bearing center width BCW. Consequently, an advantageously close spatial relation between the rotational buffer devices 115 and the areas where the traction forces are introduced into the running gear 102 (namely the traction force plane 103.4) and into the frame body 107 (namely the bearing center plane 103.5) is achieved. Finally, the volumetric center 115.2 of the rotational buffer devices 115 is located in a common plane (perpendicular to the transverse direction) with the longitudinal central axis 108.4 of the central section 108.2 of the associated longitudinal 108.

The above configuration has the advantage that, in the present example, it is possible to realize virtually the shortest possible way for the traction forces to be transmitted from the running gear 102, more precisely, ultimately from the point of wheel to rail contact, to the wagon body 101.1. Consequently, in the present example unlike in many solutions known in the art, the traction forces to be transmitted do not have to take their way through the transverse beam unit 109. This makes it possible to realize the lightweight and less rigid design of the transverse beam unit 109 as it has been outlined in detail above. As mentioned, such a less rigid design, in particular, a reduced torsional rigidity about the transverse direction, is beneficial in terms of riding comfort and derailment safety. Hence, ultimately, such the running gear 102 of the present example, at least from the point of view of riding comfort and derailment safety, is much more forgiving to unfavorable track conditions.

It will be appreciated that, when a traction force is to be transmitted in the opposite second direction (e.g. a direction of rearward travel) the two rotational buffer devices 115 (in the longitudinal direction) located on the other side of the running gear center (and forming a third and fourth rotational buffer device in the sense of the present invention) take over the function of the traction link in the same manner as it has been described above for the first and second rotational buffer device. In other words, in such a case, the third and fourth rotational buffer devices 115 form a further traction link between the running gear 102 and the wagon body 101.1 in the sense of the present invention.

Transverse motion of the wagon body 101.1 with respect to the running gear 102, in a conventional manner, is provided by two transverse buffer devices 118 mounted to the transverse beam unit 109 in proximity to the transverse damper 114.

As can be seen best from FIG. 7, the respective rotational buffer device 115 comprises a buffer unit 119 with a substantially disk shaped first support component 119.1, a substantially disk shaped second support component 119.2 and a substantially ring-shaped buffer component 119.3. The buffer component 119.3, in a support direction parallel to the longitudinal direction, is arranged between the first support component 119.1 and the second support component 119.2.

The buffer component 119.3 is adapted to damp a motion between the first support component 119.1 and the second support component 119.2 in the support direction. To achieve this damping function, in the present example, the buffer component 119.3 is made from a polyurethane (PUR) material, since these materials have turned out to be particularly suitable for achieving robust, inexpensive and long-term stable components.

It will be appreciated that any desired buffer characteristic may be selected for the buffer component 119.3. Preferably, an initially steep but subsequently degressive buffer characteristic is selected. Such a configuration provides the advantage of a quick onset of a considerable buffer force and, hence, the traction link effect and a later moderate rise in the force during larger deflections (i.e., for example, a comparatively low overall resistance when negotiating a curved track).

The first and second support component 119.1 and 119.2 are made from a metal to provide structural rigidity and a long-term stable mounting interface, respectively. The first contact surface 115.1, however, is formed by an exchangeable contact insert 119.4 of the first support component 119.1 made from plastic material to reduce friction between the first and second contact partner.

Each of the components 119.1 to 119.3, in the present example, has a dimension in the radial direction (running transverse to the support direction) that is larger than its dimension in the support direction, in particular, at least 150% to 200% of its dimension in the support direction.

Furthermore, as can be clearly seen from FIG. 7, the buffer unit 119 has a maximum buffer length $L_{RB,max}$ in the support direction and a maximum buffer diameter $D_{RB,max}$ in the radial direction which is 225% of the maximum buffer length. In addition, the buffer component 119.3 has a maximum buffer component length $L_{RBC,max}$ in the support direction and a maximum buffer component diameter $D_{RBC,max}$ in the radial direction, which is 350% of the maximum buffer component length $L_{RBC,max}$. Consequently, due to the comparatively large size of the components in the radial direction, the traction force is spread over a comparatively large component leading to a reduction of the stresses within the buffer components 119.1 to 119.3. Nevertheless, due to the comparatively short dimension of the buffer components 119.1 to 119.3 in the longitudinal direction, the overall volume required for the rotational buffer device 115 is kept within acceptable limits.

The buffer unit 119 comprises a guide device 119.5 restricting motion between the first support component 119.1 and the second support component 119.2 in the radial direction to keep radial shear stresses within the buffer component 119.3 acceptably low. To this end, the guide device 119.5 comprises a piston element 119.6 connected to the first support component 119.1 and a cylinder element 119.7 connected to the second support component 119.2.

The piston element 119.6 and the cylinder element 119.7 are located centrally received within the buffer component 109.3, such that a very compact configuration is achieved.

Furthermore, the piston element 119.6 and the cylinder element 119.7 each comprises a centering section 119.8 and 119.9, respectively, cooperating with the inner wall of the one buffer component 119.3 to provide, in a simple and space-saving manner, mutual alignment of the components of the buffer unit 119.

In an unloaded state of the buffer unit 119 (as shown in FIG. 7), the piston element 119.6 has a radial play in the radial direction with respect to the cylinder element 119.7, such that a relative tilting motion is possible between the piston element 119.6 and the cylinder element 119.7. Such tilting motion, in particular, may be appropriate when an angular deflection occurs between the running gear 102 and the wagon body 101.1, i.e. when the rotational buffer device 115 executes its generic function as a rotational buffer.

Upon loading of the buffer unit 119 and, hence, compression of the buffer component 119.3, the piston element 119.6 plunges into the cylinder element 119.7 in the support direction. In case the buffer unit 119 is loaded such that radial deflection of the first support component 119.1 is caused (with respect to the second support component 119.1), the piston element 119.6 cooperates with the cylinder element 119.7 in the radial direction to restrict relative motion in the radial direction.

Limitation of the deflection of the buffer component 119.3 in the support direction is provided by a hard stop arrangement formed by mating contact surfaces 119.10 and 119.11 formed at the respective centering section 119.8 and 119.9 of the piston element 119.6 and the cylinder element 119.7, respectively. Hence, excessive compressive loading of the buffer component 119.3 is avoided.

It will be appreciated that, in the present example, the part of the wagon body 101.1 supported on the running gear 102 has a wagon body length which is selected such that, during normal operation of the rail vehicle 101 on a given track network having a given minimum radius of track curvature, a maximum angular deflection of the wagon body with respect to the running gear about the rotational axis from a neutral, undeflected state (as shown in the Figures) is about 2.5°. To this end, the part of the wagon body 101.1 supported between the running gears 102 and 116, in the longitudinal direction, has a wagon body support length which is at most 600% of a wheel unit distance of the two wheel units 103 (more precisely of their respective axis of rotation) of the running gear 102 in the longitudinal direction. Hence, advantageously small angular deflections of the wagon body 101.1 with respect to the running gear 102 about the rotational axis as outlined above occur during normal operation of the vehicle 101.

Figure 8:
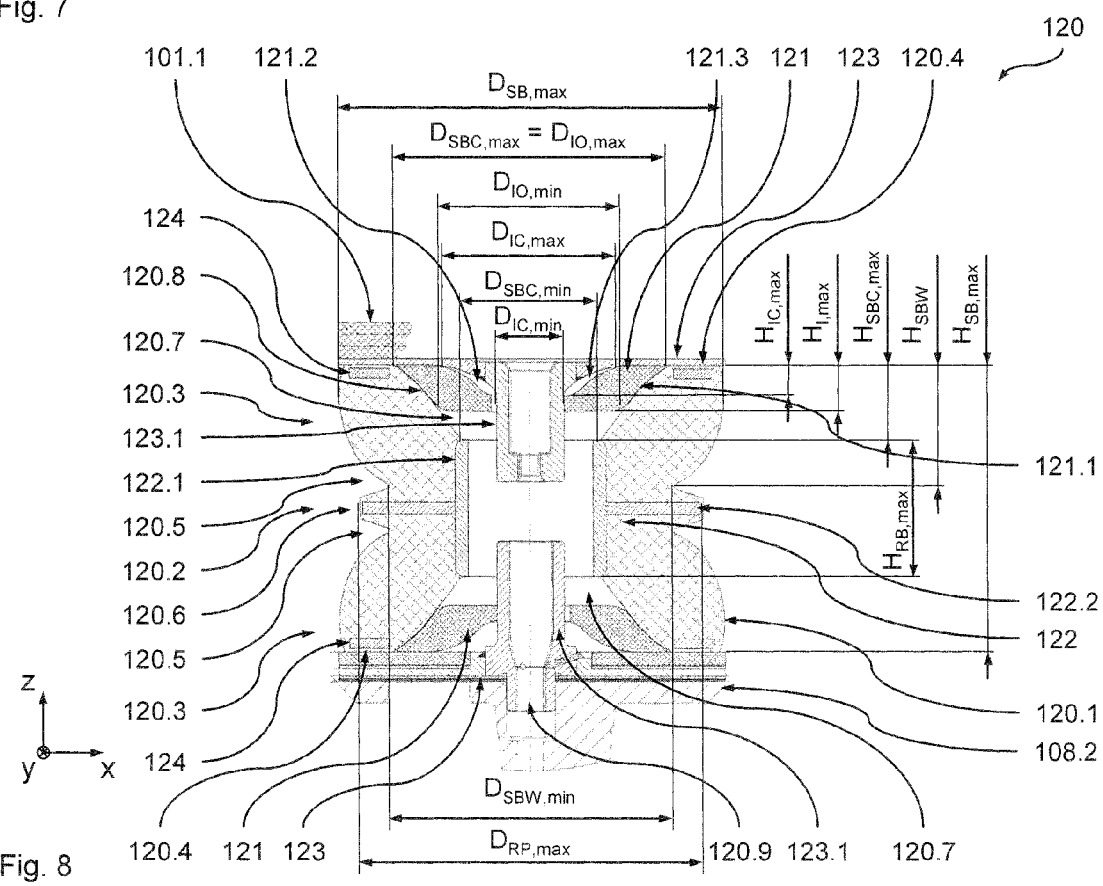
FIG. 8 is a schematic sectional view of detail VIII of FIG. 5.

As can be seen from FIGS. 5, 6 and 8, in the longitudinal direction, the rotational buffer devices 115 on each side of the vehicle are arranged to be substantially in line with each other and with two secondary suspension elements 120 of the secondary suspension device 106 located between them. Thereby, a particularly beneficial transmission of the forces between the running gear 102 and the wagon body 101.1.

As can be seen best from FIG. 7, according to an aspect of the present invention, each secondary suspension element is formed by a spring device 120 comprising a spring body 120.1 substantially made of a polymeric material, namely rubber, and defining an axial direction (in a neutral state as shown being parallel to the height direction) and a radial direction.

The spring body 120.1, in the axial direction, has a central section 120.2 located between a first end section 120.3 terminating in a first outer end surface 120.4 and a second end section 120.3 terminating in a second outer end surface 120.4. The central section 120.2 has two radially waisted sections 120.5 separated by a centrally located (in the axial direction) protrusion 120.6 of the spring body 120.1.

Each of the and sections has a recess extending, in the axial direction, from the outer end surface 120.4 towards the central section 120.2 such that an axial spring body cavity 120.7 is formed. The axial spring body cavity 120.7 is confined by a compliant inner surface 120.8 of the spring body 120.1.

An insert 121 made from a polymeric material, namely from a polyamide (PA) material, is inserted into the axial spring body cavity 120.7. The insert 121 contacts the compliant inner surface 120.8 of the spring body 120.1 to modify a rigidity of the spring device compared to a reference state, where the insert 121 is not inserted into the axial spring body cavity 120.7. More precisely, the insert modifies both, the axial rigidity (in the axial direction) and the transverse rigidity (transverse to the actual direction) of the spring device 120.

It should be noted that the insert 121 may not only be used to statically modify the respective mechanical property, e.g. by simply adding a constant offset to the respective characteristic of the spring body 120.1. Rather, the insert 121 may also be used to variably modify the characteristic of the respective rigidity. Hence, for example, depending on the design of the insert 121, the insert 121 may be used to provide not only an at least section wise constant offset in the characteristic of the respective rigidity with increasing deflection. It may also be used to provide an at least section wise progressive and/or and at least section wise degressive characteristic of the respective rigidity.

In the present example, the insert 121 is a substantially dome shaped, ring toroid component having a generally conical outer shape appropriately mating with the compliant spring body cavity wall 120.8. To this end, the insert 121 is confined by an insert outer wall surface 121.1, the insert outer wall surface, in a sectional plane comprising a central axis of the insert (as shown in FIG. 8), has a curved sectional contour.

To achieve the desired modification of the corresponding rigidity, tuning of the mechanical properties of the insert 121, in particular, its resistance to deflection, is achieved by providing an insert cavity 121.2 located at an end side of the insert 121 facing away from the central section 120.2 of the spring body 120.1. Such an insert cavity 121.2 provides an additional degree of design freedom which allows a very simple adaptation of the resistance to deflection by simply modifying the shape of the cavity 121.2.

The insert cavity 121.2 also is of a substantially toroid, generally conical outer shape, thereby allowing a very simple and easy to manufacture adaptation of the mechanical properties of the insert 121. Here is well, the insert cavity is confined by an insert cavity wall surface 121.3 which, in a sectional plane comprising a central axis of the insert cavity (as shown in FIG. 8), has a curved sectional contour.

The spring body 120.1 has a substantially toroid outer shape, more precisely, the spring body 120.1 is substantially hour-glass shaped. Hence, the spring body is confined by a spring body outer wall surface which, in a sectional plane comprising a central axis of the spring body 120.9 (as shown in FIG. 8), has a section-wise curved sectional contour and (in the region of the radial protrusion 120.6) a section-wise polygonal sectional contour.

Similar applies to the spring body cavity 120.7. In the embodiment shown, the spring body cavity 120.7 has a substantially toroid outer shape, namely a generally conical outer shape. The compliant spring body cavity wall surface 120.8, in a sectional plane comprising the central axis 120.9 (as shown in FIG. 8), has a section-wise curved sectional contour.

The dimensions of the spring body 120.1 and the spring body cavity 120.7 are adapted to the specific application of the spring device 120, in particular to the axial rigidity and the transverse rigidity of the spring device 120 to be achieved, by selecting the following dimensions.

Generally, the spring body 120.1 defines, in the first end section 120.3 and in the radial direction, a maximum outer spring body diameter $D_{SB,max}$, while each waisted section 120.5, in the radial direction, defines a minimum waist diameter $D_{SBW,min}$ of the spring body 120.1 located, in the axial direction, at a maximum axial waist distance $H_{SBW}$ from the outer end surface 120.4. In the present embodiment, the minimum waist diameter $D_{SBW,min}$ is 76% of the maximum outer spring body diameter $D_{SB,max}$. In addition, the spring body 120.1, in the axial direction, extends over a maximum axial spring dimension $H_{SB,max}$, the maximum axial waist distance $H_{SBW}$ being 41% of the maximum axial spring dimension $H_{SB,max}$.

Furthermore, generally, the spring body cavity 120.7 defines, in the radial direction, a maximum spring body cavity diameter $D_{SBC,max}$ and a minimum spring body cavity diameter $D_{SBC,min}$, and, in the axial direction, a maximum axial spring body cavity dimension $H_{SBC,max}$. In the present example, the maximum spring body cavity diameter $D_{SBC,max}$ is 70% of the maximum outer spring body diameter $D_{SB,max}$. In addition, the minimum spring body cavity diameter $D_{SBC,min}$ is 50% of the maximum spring body cavity diameter $D_{SBC,max}$. Furthermore, the maximum axial spring body cavity dimension $H_{SBC,max}$ is 63% of the maximum axial waist distance $H_{SBW}$.

The dimensions of the insert 121 and the insert cavity 121.2 are adapted to the specific modification of the respective rigidity of the spring device 120 to be achieved. In the present example, the following dimensions are chosen.

Generally, the insert 121 defines, in the radial direction, a maximum outer insert diameter $D_{IO,max}$ and a minimum outer insert diameter $D_{IO,min}$, and, in the axial direction, a maximum axial insert dimension $H_{I,max}$. In the present example, the minimum outer insert diameter $D_{IO,min}$ is 61% of the maximum outer insert diameter $D_{IO,max}$. Furthermore, the maximum axial insert dimension $H_{I,max}$ is 58% of a maximum axial spring body cavity dimension $H_{SBC,max}$ (in the axial direction).

Furthermore, generally, the insert cavity 121.2 (in the radial direction) defines a maximum insert cavity diameter $D_{IC,max}$ and a minimum insert cavity diameter and, in the axial direction, a maximum axial insert cavity dimension $H_{IC,max}$. Here, the maximum insert cavity diameter $D_{IC,max}$ is 68% of the maximum outer insert diameter $D_{IO,max}$. In addition, the minimum insert cavity diameter $D_{IC,min}$ is 37% of the maximum insert cavity diameter $D_{IC,max}$. Furthermore, the maximum axial insert cavity dimension $H_{IC,max}$ is 71% of the maximum axial insert dimension $H_{I,max}$.

It should be noted that, due to their rotationally symmetric design, the spring body 120.1 and the insert 121 provide, in the radial direction and the transverse direction, respectively, a nondirectional behavior.

As can be seen best from FIG. 8, the central section 120.2 of the spring body 120.1 comprises an inner reinforcement unit 122. The inner reinforcement unit 122 comprises a hollow cylindrical reinforcement bush 122.1 which, in the radial direction, defines a maximum outer bush diameter $D_{RB,max}$ and, in the axial direction, a maximum axial bush dimension $H_{RB,max}$.

In the present example, the bush 122.1, in the axial direction, reaches up to the spring body cavity 120.7, such that proper reinforcement of the sensitive central section 120.2 is achieved. Furthermore, the bush 122.1, in the axial direction, forms an axial passage through the central section 120.2 which is radially and axially substantially centrally located. By this means, the comparatively lightweight configuration may be achieved. In the present example, the bush 122.1, at its outer circumference, is firmly connected to the spring body 120.1.

The dimensions of the bush 122.1 are adapted to the specific mechanical properties of the spring device 120 to be achieved by selecting the following dimensions. The maximum outer bush diameter $D_{RB,max}$ is 98% of the maximum spring body cavity diameter $D_{SBC,max}$. In addition, the maximum axial bush dimension $H_{RB,max}$ is 49% of the maximum axial spring body dimension $H_{SB,max}$ in the axial direction.

Furthermore, the inner reinforcement unit 122 comprises a ring shaped reinforcement plate element 122.2, mainly extending in the radial direction and defining, in the radial direction, a maximum outer reinforcement plate diameter $D_{RP,max}$. In the present example, the maximum outer reinforcement plate diameter $D_{RP,max}$ is 89% of the maximum spring body diameter $D_{SB,max}$.

The reinforcement plate element 122.2 is a single reinforcement element firmly connected, in the radial direction, to the reinforcement bush 122.1. In the present example, the reinforcement plate element is axially centrally located in the area of the radial protrusion 120.6. The reinforcement plate element 122.2 is substantially fully embedded in the spring body 120.1, thereby achieving corrosion protection on the reinforcement plate element 122.2. Furthermore, in the present example, the reinforcement unit 122 is made from a metal, thereby achieving simple and inexpensive reinforcement. A particularly lightweight design is achieved using an aluminum (Al) material for the reinforcement unit 122.

The end sections 120.3 of the spring body 120.1 are covered by a support plate element 123 providing an interface that is easily handled during manufacture of the vehicle 101. Each support plate element 123 comprises a centering section 123.1 axially protruding into the spring body cavities 120.7, thereby achieving a proper interface to the adjacent vehicle component. Furthermore, in the present example, each of the end sections 120.3 has an embedded ring shaped reinforcement component 124 located close to the outer end surface 120.4. In the present example, a metal, namely an aluminum (Al) material, is chosen for the support plate element 123 and the embedded reinforcement component 124.

As can be seen from FIG. 1, the wagon body 101.1 (more precisely, either the same part of the wagon body 101.1 also supported on the first running gear 102 or another part of the wagon body 101) is supported on a further, second running gear 116. The second running gear 116 is identical to the first running the 102 in all the parts described above. However, while the first running gear 102 is a driven running gear with a drive unit (not shown) mounted to the frame body 107, the second running gear 116 is a non-driven running gear, having no such drive unit mounted to the frame body 107.

Hence, according to a further aspect of the present invention, the frame body 107 forms a standardized component which used for both, the first running gear 102 and the second running gear, i.e. different types of running gear. Customization of the respective frame body 107 to the specific type of running gear type may be achieved by additional type specific components mounted to the standardized frame body 107. Such an approach is highly advantageous in terms of its commercial impact. This is due to the fact that, in addition to the considerable savings achieved due to the automated casting process, only one single type of frame body 107 has to be manufactured, which brings along a further considerable reduction in costs.

It should again be noted in this context that customization of the running gear 102, 116 to a specific type or function on the basis of identical frame bodies 107 is not limited to a differentiation in terms of driven and non-driven running gears. Any other functional components (such as e.g. specific types of brakes, tilt systems, rolling support systems, etc.) may be used to achieve a corresponding functional differentiation between such running gears on the basis of standardized identical frame bodies 107.

Although the present invention in the foregoing has only a described in the context of low-floor rail vehicles, it will be appreciated, however, that it may also be applied to any other type of rail vehicle in order to overcome similar problems with respect to a simple solution for reducing the manufacturing effort.

The invention claimed is:

1. A spring device for a secondary suspension device of a rail vehicle, comprising:
a spring body substantially made of a polymeric material and defining an axial direction and a radial direction;
said spring body, in said axial direction, having a central section located between a first end section terminating in a first outer end surface and a second end section terminating in a second outer end surface;
said central section having at least one radially waisted section;
said first end section having a recess extending, in said axial direction, from said first outer end surface towards said central section wherein an axial spring body cavity is formed, said axial spring body cavity being confined by a compliant inner surface;
wherein
a ring-shaped insert is inserted into said axial spring body cavity;
wherein said insert is located at an end of said first end section terminating in said first outer end surface; and
wherein said insert contacts said compliant inner surface of said spring body to modify a rigidity of said spring device.

2. The spring device according to claim 1, wherein
said insert is configured to modify at least one of an axial rigidity and a transverse rigidity of said spring device;
wherein said axial rigidity is a rigidity of said spring device in said axial direction;
wherein said transverse rigidity is a rigidity of said spring device in a transverse direction running transverse to said axial direction.

3. The spring device according to claim 1, wherein said insert is at least one of a substantially dome shaped component and a toroid component.

4. The spring device according to claim 3, wherein
said insert defines, in said radial direction, a maximum outer insert diameter and a minimum outer insert diameter, and. in said axial direction, a maximum axial insert dimension;
wherein said minimum outer insert diameter is 40% to 90%, of said maximum outer insert diameter; and
wherein said maximum axial insert dimension is 40% to 80%, of a maximum axial spring body cavity dimension in said axial direction.

5. The spring device according to claim 4, wherein
said insert cavity defines, in said radial direction, a maximum insert cavity diameter and a minimum insert cavity diameter, and, in said axial direction, a maximum axial insert cavity dimension;
wherein said maximum insert cavity diameter is 50% to 90% of said maximum outer insert diameter;
wherein said minimum insert cavity diameter is 20% to 60% of said maximum insert cavity diameter; and
wherein said maximum axial insert cavity dimension is 50% to 90% of a maximum axial insert dimension in said axial direction.

6. The spring device according to claim 3, wherein said insert is of a substantially toroid outer shape;
wherein said insert, is confined by an insert outer wall surface, said insert outer wall surface, in a sectional plane comprising a central axis of said insert, having a section-wise curved sectional contour or a section-wise straight sectional contour or a section-wise polygonal sectional contour;
wherein said insert, has an insert cavity located at an end side of said insert facing away from said central section of said spring body;
wherein said insert cavity is of a substantially toroid outer shape; and
wherein said insert cavity, is confined by an insert cavity wall surface, said insert cavity wall surface, in a sectional plane comprising a central axis of said insert cavity, having a section-wise curved sectional contour or a section-wise straight sectional contour or a section-wise polygonal sectional contour.

7. The spring device according to claim 1, wherein said spring body is made from a first material and said insert is made from a second material different from said first material.

8. The spring device according to claim 7, wherein
said central section comprises an inner reinforcement unit;
wherein said inner reinforcement unit comprises a hollow cylindrical bush;
wherein said hollow cylindrical bush, in said radial direction, defines a maximum outer bush diameter and, in said axial direction, a maximum axial bush dimension;
wherein said hollow cylindrical bush, in said axial direction, reaches up to said axial spring body cavity;
wherein said hollow cylindrical bush, in said axial direction, forms a, radially or axially substantially centrally located, axial passage through said central section:
wherein said hollow cylindrical bush, at its outer circumference, is firmly connected to said spring body:
wherein said maximum outer bush diameter, in particular, is 85% to 115%, of a maximum spring body cavity diameter in said radial direction; and
wherein said maximum axial bush dimension, in particular, is 35% to 65%, of a maximum axial spring body dimension in said axial direction.

9. The spring device according to claim 8, wherein
said central section comprises an inner reinforcement unit;
wherein said inner reinforcement unit comprises a reinforcement plate element;
wherein said reinforcement plate element, in said radial direction, defines a maximum outer reinforcement plate diameter;
wherein said reinforcement plate element, in said radial direction is connected to said bush;
wherein said reinforcement plate element, is located in an area of an, radially or axially substantially centrally located, local radial protrusion of said spring body:
wherein said reinforcement plate element, in particular, is substantially fully embedded in said spring body;
wherein said maximum outer reinforcement plate diameter, is 75% to 105%, of a maximum spring body diameter in said radial direction.

10. The spring device according to claim 8, wherein
said reinforcement unit is made from a third material;
said third material being a metal.

11. The spring device according to claim 10, wherein said third material is an aluminum (Al) material.

12. The spring device according to claim 7,
wherein said first material is less rigid than said second material;
wherein said insert is made from a first polymeric material;
wherein said spring body is made from a second polymeric material;
wherein at least one of said insert and said spring body is a monolithic component; and
wherein at least one of said insert and said spring body is a substantially rotationally symmetric component.

13. The spring device according to claim 1, wherein said spring body is of a substantially toroid outer shape; and wherein said spring body is confined by an spring body outer wall surface, said spring body outer wall surface, in a sectional plane comprising a central axis of said spring body, having a section-wise curved sectional contour or a section-wise straight sectional contour or a section-wise polygonal sectional contour.

14. The spring device according to claim 13, wherein said spring body cavity is of a substantially toroid outer shape; and
wherein said axial spring body cavity, is confined by an spring body cavity wall surface forming said compliant inner surface, said spring body cavity wall surface, in a sectional plane comprising a central axis of said axial spring body cavity, having a section-wise curved sectional contour or a section-wise straight sectional contour or a section-wise polygonal sectional contour.

15. The spring device according to claim 1, wherein
said spring body defines, in said first end section and in said radial direction, a maximum outer spring body diameter;
wherein said at least one waisted section, in said radial direction, defines a minimum waist diameter of said spring body located, in said axial direction, at a maximum axial waist distance from said first outer end surface;
wherein said minimum waist diameter is 50% to 90%, of said maximum outer spring body diameter; and
wherein said spring body, in said axial direction, extends over a maximum axial spring dimension, said maximum axial waist distance, being 30% to 50%, of said maximum axial spring dimension.

16. The spring device according to claim 15, wherein
said axial spring body cavity defines, in said radial direction, a maximum spring body cavity diameter and a minimum spring body cavity diameter, and, in said axial direction, a maximum axial spring body cavity dimension;
wherein said maximum spring body cavity diameter is 50% to 90%, of said maximum outer spring body diameter; or
wherein said minimum spring body cavity diameter is 30% to 70%, of said maximum spring body cavity diameter; and
wherein said maximum axial spring body cavity dimension is 40% to 90%, of said maximum axial waist distance.

17. The spring device according to claim 1, wherein
at least one of said first end section and said second end section is covered by a support plate element;
wherein at least one of said first end section and said second end section has an embedded reinforcement component;
wherein said support plate element, comprises a centering section axially protruding into a cavity of said spring body;
wherein said embedded reinforcement component, is embedded in said spring body close to said outer end surface; and
at least one of said support plate element and said embedded reinforcement component being made from a metal.

18. The spring device according to claim 17, wherein said embedded reinforcement component is made from an aluminum (Al) material.

19. The spring device according to claim 1, wherein
said second end section has a recess extending, in said axial direction, from said second outer end surface towards said central section such that a further axial spring body cavity is formed, said further axial spring body cavity being confined by a further compliant inner surface;
wherein a further insert is inserted into said further axial spring body cavity; and
wherein said further insert contacts said inner surface of said spring body to modify a rigidity of said spring device.

20. A running gear for a rail vehicle, comprising
a running gear frame,
two wheel units supporting the running gear frame via a primary spring unit, and
a secondary spring unit between the running gear frame and the rail vehicle comprising a spring device according to claim 1.

* * * * *